United States Patent
Muhonen

(10) Patent No.: US 7,197,034 B2
(45) Date of Patent: Mar. 27, 2007

(54) CLOSED USER GROUP SERVICE IN A MOBILE COMMUNICATION SYSTEM

(75) Inventor: Ahti Muhonen, Hirvihaara (FI)

(73) Assignee: Nokia Corporation, Espoo (FI)

( * ) Notice: Subject to any disclaimer, the term of this patent is extended or adjusted under 35 U.S.C. 154(b) by 990 days.

(21) Appl. No.: 10/091,601

(22) Filed: Mar. 7, 2002

(65) Prior Publication Data

US 2002/0131407 A1 Sep. 19, 2002

Related U.S. Application Data

(63) Continuation of application No. PCT/FI00/00770, filed on Sep. 12, 2000.

(30) Foreign Application Priority Data

Sep. 13, 1999 (FI) .................................. 19991949

(51) Int. Cl.
*H04L 12/28* (2006.01)
(52) U.S. Cl. ...................... 370/392; 455/565
(58) Field of Classification Search ................ 370/310, 370/351, 389, 392, 395.2, 395.21, 312, 313; 455/26.1, 565; 710/36; 379/188, 93.02, 379/196–200
See application file for complete search history.

(56) References Cited

U.S. PATENT DOCUMENTS

| 5,512,885 A | 4/1996 | Agestam et al. |
| 5,987,520 A | 11/1999 | Libby et al. |
| 6,311,055 B1 * | 10/2001 | Boltz ..................... 455/414.1 |
| 6,463,276 B1 * | 10/2002 | Jonsson ..................... 455/410 |
| 2004/0062368 A1 * | 4/2004 | Durkin ................... 379/93.02 |

FOREIGN PATENT DOCUMENTS

| WO | WO 99/08468 | 2/1999 |
| WO | WO 99/20031 | 4/1999 |
| WO | WO 99/37103 | 7/1999 |

OTHER PUBLICATIONS

ETSI GSM 02.60 V8.0.0 (Mar. 1999), Digital cellular telecommunications system (Phase 2+); General Packet Radio Service (GPRS); Service Description; Stage 1, 50 pp.
ETSI, GSM 02.85, Version 5.0.0 Nov. 1996, Digital cellular telecommunications system, Clsoed User Group (CUG) Supplementary Services—Stage 1, 19 pp.
M. Mouly and M. Pautet, "The GSM System for Mobile Communications", Palaiseau, France, 700 pp, (1992).

* cited by examiner

*Primary Examiner*—Chau Nguyen
*Assistant Examiner*—Kerri M. Rose
(74) *Attorney, Agent, or Firm*—Pillsbury Winthrop Shaw Pittman LLP

(57) ABSTRACT

A method and apparatus for providing closed user group service in a packet radio system, which includes at least one network and at least one group including a plurality of subscribers. The closed user group access conditions for at least one subscriber are determined in the network, the access conditions include at least one of the following conditions: right to communicate with parties outside the group, and right to communicate with at least one member of the group without communicating with all members of the group. The access conditions are checked when packets are being sent to/from the subscriber. The packets are transferred if the access conditions allow the transmission.

25 Claims, 3 Drawing Sheets

CLOSED USER GROUP SERVICE IN A MOBILE COMMUNICATION SYSTEM

This application is a Continuation of International Application PCT/FI00/00770 filed on Sep. 12, 2000, which designated the U.S. and was published under PCT Article 21(2) in English.

The present invention relates to a method of providing closed user group service in a mobile communication system enabling packet-switched data services, comprising at least one network and at least one group comprising a plurality of group subscribers, the network enabling the transfer of packets to pre-defined group subscribers.

The invention further relates to a telecommunication system providing packet-switched data services, comprising at least one network and at least one group comprising a plurality of group subscribers, the network being arranged to transfer packets to pre-defined group subscribers.

The invention also relates to a network element in a packet radio system.

In addition to normal speech and data transmission, mobile communication systems provide a plurality of supplementary services for subscribers. One of the supplementary services provided in some mobile communication systems is closed user group service. By means of the closed user group service, several different restrictions concerning the internal or external telecommunications can be defined for a selected group of subscribers. Call restrictions available include e.g. barring of incoming or outgoing calls and barring of calls to certain numbers. Closed user groups are typically applied in companies, in which it is desirable to restrict the use of mobile stations given to employees mainly to professional purposes. In the call set-up process, closed user groups cause additional checks, on the basis of which call set up is either continued normally or is discontinued due to call restrictions.

A closed user group (CUG) supplementary service has been specified for GSM (Global System for Mobile Communications) circuit switched services. The CUG service enables subscribers to form closed user groups to and from which access is restricted. A specific user may be a member of one or more CUGs. Members of a specific CUG can communicate with each other but not, in general, with users outside the group.

GSM 02.85 v. 5.0.0 defines stage 1 of the CUG supplementary service. In the GSM system, a closed user group is identified unequivocally by means of a CUG interlock code IC. Closed user groups are indicated to a subscriber with a CUG index, which is typically converted in the visitor location register VLR. When the user belongs to several closed user groups, one group may be appointed as the preferential CUG.

Group-specific definitions of the members of a closed user group, hereafter referred to as CUG subscribers, can be further specified by adding or removing restrictions. Subscription options may allow only calls within a CUG or also inter-CUG access may be allowed. A CUG subscriber with incoming access can receive calls from outside the subscriber group. Correspondingly, a CUG subscriber with outgoing access can also make calls outside the group. There may be also intra-CUG restrictions: Incoming calls barred within a group prevents a CUG subscriber from receiving calls from other members of the same group. Correspondingly, a CUG subscriber with outgoing calls barred within a group cannot call other members of the same group.

As the use of different data transmission services in offices has increased, different data services have also been introduced into mobile communication systems. In order to allow packet-switched data transmission in GSM networks, general packet radio service (GPRS) has been developed. The GPRS allows the service subscriber to send and receive data in an end-to-end packet transfer mode.

There are two categories of GPRS services: point to point (PTP) services and point to multipoint (PTM) services. The PTP service provides a transmission of one or more packets between two users, initiated by a service requester and received by a receiver. The GPRS PTM services provide a subscriber with the capability to send data to multiple destinations with a single service request. There are three PTM services: PTM Multicast (PTM-M), PTM Group Call (PTM-G) and IP (Internet Protocol) Multicast (IP-M).

The PTM Group Call is a service which enables packets to be transmitted within a specified group identified by IMGI (International Mobile Group Identity). The PTM-G service allows members of a PTM-G group to establish a logical relationship within the group for the purposes of transferring data. This logical relationship may be referred to as a group call. The packets are transmitted only within cells which are known to contain participants of the specific receiver group. Optionally the transfer of packets may be limited to group participants within the geographical area(s) as defined by the service requester.

The PTM-G service has three different subscription classes. The controller has a right to create and to remove a group and control over the memberships. The initiator has a right to initiate and to terminate group calls, and to communicate with other group members. The participant has a right to communicate with other group members.

A group call initiator initiates a group call by means of a call initiate operation. The network assigns a call identification and confirms to the initiator that the call has been created and optionally transmits a group-call-notification to all the group members. A group member may choose to join a group call and thereby become a group call participant, by informing the network by the join call operation. A participant may leave a group call at any time by informing the network by the leave call operation. Data transfer operations may occur at any time following group call initiation. Data transfers for the group call may be restricted to the geographical area designated during the group call initiate operation. Data transfers are distributed only to the participants including the initiator. The initiator may terminate a group call by means of the call terminate operation. The network notifies the participants of the group call termination. For more details of the PTM-G service, reference is made to GSM specification 02.60, v. 8.0.0, pages 15–27.

There are situations, when group members may need to exchange data packets with terminals not belonging to the group. Also, a group member may wish to send a document to or receive a message from a colleague also belonging to the group. However, especially in the GPRS, a group subscriber using the PTM-G service is only able to send packets to all members of the group and receive data only from the members of the group.

The object of the invention is to provide a method and means for eliminating the problems described above. A method according to the invention is characterized by determining closed user group access conditions for at least one subscriber belonging to the group, said access conditions comprising at least one of the following conditions:

right to communicate with parties outside the group, right to communicate with at least one member of the group without communicating with all members of the group, checking said access conditions when packets are being sent to/from the subscriber and transferring packets to desired addresses if said access conditions allow the transmission.

The mobile telecommunications system according to the invention is characterized in that the network comprises means for determining closed user group access conditions for at least one subscriber belonging to the group, said access conditions comprising at least one of the following conditions:

right to communicate with parties outside the group, right to communicate with at least one member of the group without communicating with all members of the group, the network is arranged to check said access conditions when packets are being sent to/from the subscriber and the network is arranged to transfer packets to desired addresses if said access conditions allow the transmission.

The network element according to the invention is characterized in that the network element comprises means for determining access conditions for at least one subscriber belonging to at least one closed user group, said access conditions comprising at least one of the following conditions:

right to communicate with parties outside the group, right to communicate with at least one member of the group without communicating with all members of the group, the network element comprises means for checking said access conditions when packets are being sent to/from the subscriber and the network element is arranged to send packets if said access conditions allow the transmission.

The preferred embodiments of the invention are set forth in the dependent claims.

The invention is based on enabling the subscriber to send packets to or receive packets from parties outside the closed user group and/or enabling a closed user group subscriber to communicate with at least one subscriber belonging to the same group. This can be done by determining closed user group access conditions for at least one subscriber preferably in a centralized data base and checking the access conditions every time packets are being sent to/from the subscriber. Packets are transmitted if the access conditions allow the transmission. There may be access conditions determining the addresses allowed to a group subscriber. The access conditions may advantageously be determined separately for incoming and outgoing packets, i.e. a subscriber may have the right to send packets outside the group but not to receive packets outside the group. The group may be selected during the activation of a data transfer arrangement, e.g. during the PDP context activation, or the group may be identified when packets are being sent.

The invention enables closed user group service in networks providing packet data services, such as the GPRS with similar features as specified for the GSM CUG service. Especially, a group subscriber is able to send packets to or receive packets from addresses outside the group and/or two or more group subscribers are able to communicate bilaterally. Furthermore, the subscriber may send packets to part of the group subscribers. It is possible to determine very detailed access conditions for each subscriber. According to a preferred embodiment of the invention, it is possible to send adjacent packets without rechecking the access conditions after the first packet if source and destination addresses are the same in the adjacent packets as in the first packet. This reduces the number of CUG access condition checks in the network. Yet another advantage of an embodiment of the invention is that the subscriber is able to be involved in several closed user groups.

The invention will be described in further detail in the following by means of preferred embodiments with reference to the accompanying drawings, in which FIG. 1 describes the basic elements of GSM/GPRS mobile communication system;

In the following, the invention will be described by using the functions and structure of the GSM/GPRS system as an example, but the invention can also be applied to other similar mobile communication systems providing packet-switched services. As the specifications of the GPRS are not as advanced as those of many other GSM specifications, all GPRS terms should be interpreted as being descriptive rather than limiting terms.

Figure 1:
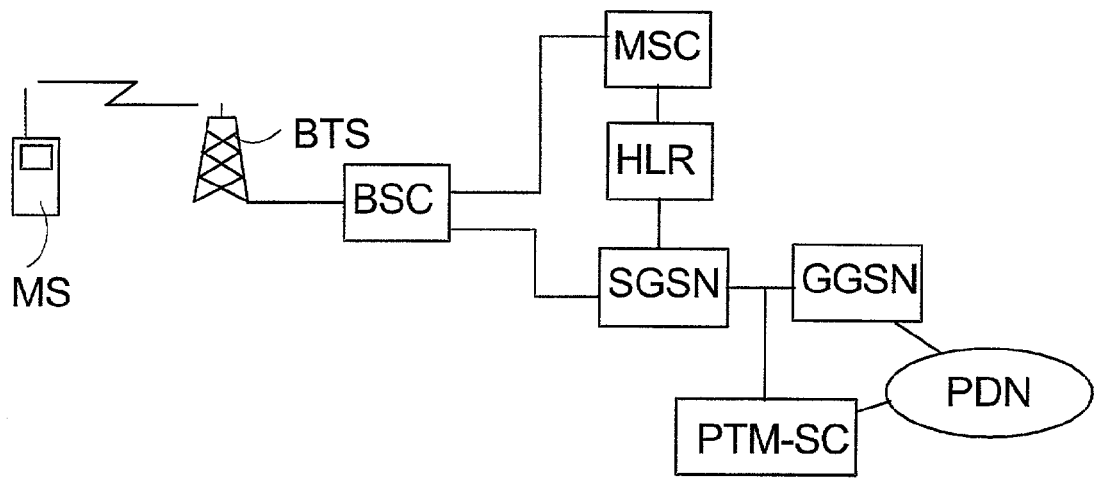

FIG. 1 describes the basic components of the GSM/GPRS system without illustrating their features or other components of the system in greater detail. A mobile station MS is located in a cell served by a base station BTS. The MS comprises a removable SIM application (Subscriber Identity Module). A number of base stations are connected to a base station controller BSC which controls the radio frequencies and channels. Base station controllers BSC are connected to a mobile services switching centre MSC.

In FIG. 1, the GPRS system connected to the GSM network comprises one serving GPRS support node SGSN and GPRS gateway support node GGSN. The different SGSNs and GGSNs are interconnected by a backbone network, which is typically based on IP-protocols.

The SGSN is connected to the BSC and is the service access point to the GPRS network for the GPRS mobile station MS. The SGSN also handles the authentication of GPRS mobile stations. If the authentication is successful, the SGSN registers the MS to the GPRS network and takes care of its mobility management. When the MS wants to send data to external networks, the SGSN relays the data to the relevant GGSN after routing context is established. The home location register HLR comprises GPRS subscriber data and routing information and is typically also used by the MSC.

The GGSN is connected to the external networks PDN such as other operators' GPRS systems, the Internet, the X.25, and the Integrated Services Digital Network (ISDN). From the external networks' point of view the GGSN is a router to a subnetwork, because the GGSN hides the GPRS infrastructure from the external networks. When the GGSN receives data addressed to a GPRS subscriber it checks if the address is active. If so, the GGSN forwards the data to the SGSN serving the MS, but if the address is inactive active, the data is typically discarded. The mobile originated packets are routed to external networks PDN by the GGSN.

The point-to-multipoint service centre (PTM-SC) is the access point to PTM services and the central element in the PTM system. The PTM-SC receives PTM service requests from different entities and takes care of the scheduling, transmission and retransmission of packets according to given user parameters. According to the invention, the PTM-SC may have access also to the external networks PDN.

As regards a more precise description of the GSM/GPRS system, reference is made to ETSI (European Telecommunications Standards Institute) GPRS specifications and to "The GSM system for Mobile Communications", M. Mouly and M. Pautet, Palaiseau, France, 1992, ISBN: 2-9507190-0-0-7.

The CUG service functionality in GPRS may be implemented as an enhancement to the already specified services. In the following a preferred embodiment of the invention is described, in which the additional functionality required for the CUG service is added to the PTM-SC network element.

The PTM-SC according to the preferred embodiment of the invention comprises CUG subscriber information and takes care of the delivery of packets to the right CUG subscribers according to predefined access conditions. Also packet transfer outside the CUG may be possible. The PTM-SC comprises necessary information about CUG groups and subscribers preferably in a CUG database DB memory. The PTM-SC comprises means for defining the CUG subscriber from source or destination address field of packets. The packets may also comprise other CUG-related information such as an indication on the requested CUG.

Figure 2:
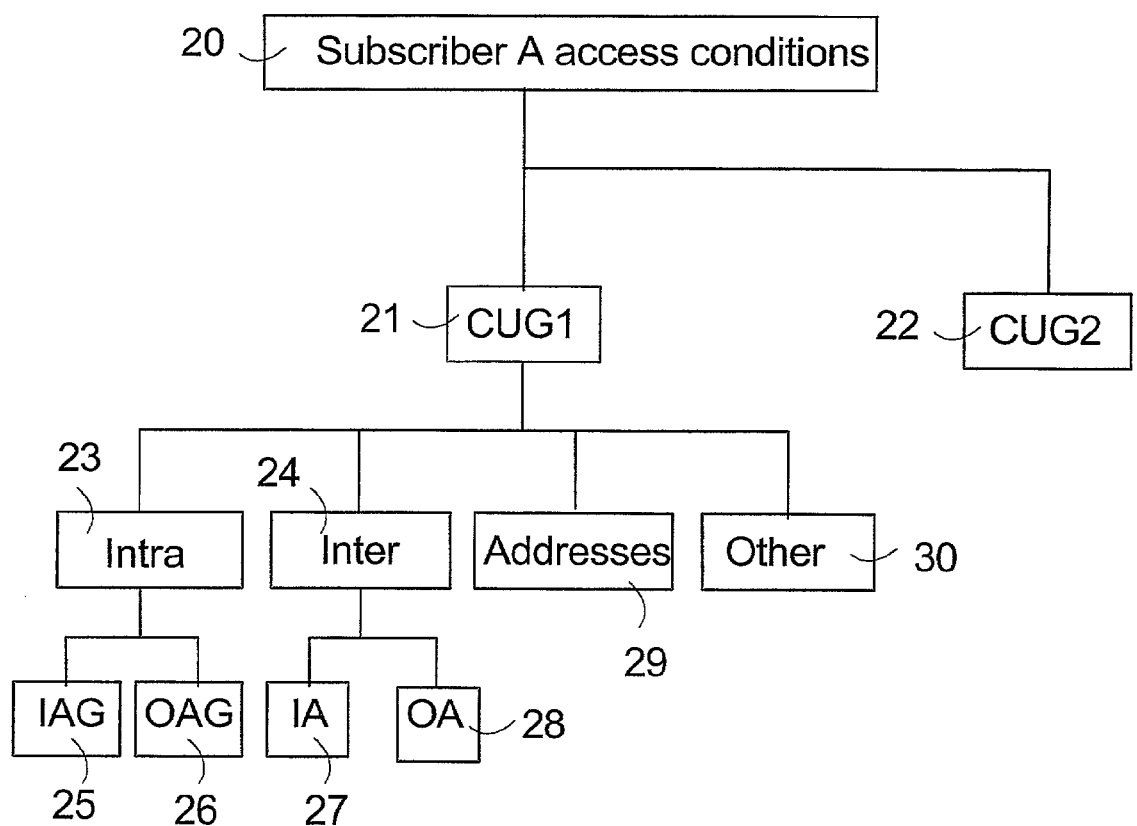
FIG. 2 illustrates different CUG subscriber access conditions.

CUG information may be organized in many ways e.g. group-specifically or subscriber-specifically. FIG. 2 illustrates CUG subscriber access conditions in the DB for subscriber A. Subscriber A data 20 may comprise the subscribed CUGs and, optionally, information about a preferred CUG. The access conditions for each CUG 21, 22 may be determined separately. The access conditions may be divided into intra-group access conditions 23 and inter-group access conditions 24 which can be further specified by separate conditions for incoming and outgoing packets. Intra-group conditions 23 may thus define whether the subscriber has the right to receive packets from member of CUG 25 (IAG, Incoming Access within the group) or to send packets to members of CUG 26 (OAG, Outgoing Access within the group). Correspondingly the inter-group conditions 24 may further define whether the subscriber has right to send 28 (OA, Outgoing Access) or receive 27 (IA, Incoming Access) packets outside the CUG. For instance, there are four possible inter-group conditions: The subscriber is not able to communicate outside the CUG, the subscriber is able to send packets outside the CUG, the subscriber is able to receive packets from outside the CUG or the subscriber is able to both send and receive packets outside the CUG. It is not necessary to determine conditions for each category described above. Preferably at least the inter-group conditions are defined for CUG subscribers.

The access conditions may also comprise a list of allowed or denied addresses 29, which are typically IP addresses. Preferably the addresses to/from which access is allowed are listed. There may be also other CUG related information 30 in the DB such as the applicability to different services. It is not mandatory to have information in each access condition category.

All traffic to and from CUG subscribers goes preferably through the PTM-SC. In order to determine, check and modify the access conditions, the PTM-SC comprises at least memory and data processing means. The PTM-SC checks the access conditions in the DB and allows service provision when appropriate. Preferably the same principles as specified for the GSM CUG service in 02.85 v. 5.0.0 will be used when the PTM-SC makes the decisions for service provision for GPRS CUG subscribers. For instance, if a CUG subscriber with a preferential CUG but no OA capability requests the activation of routing context (PDP context activation) without any CUG information, the packets will be sent according to the preferential CUG. The PTM-SC according to the preferred embodiment of the invention may also serve CUG subscribers from fixed networks.

Figure 3:
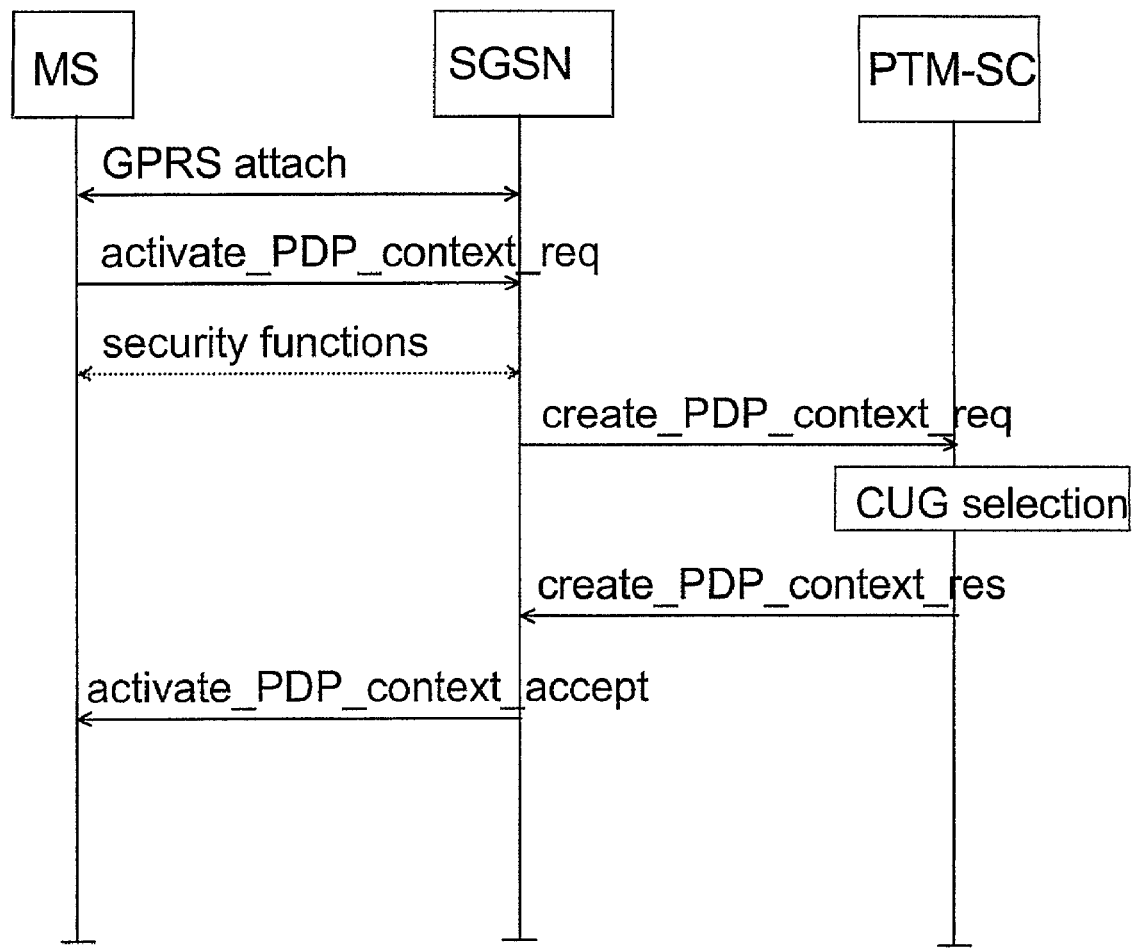
FIG. 3 is an exemplary signalling diagram of service activation and CUG selection for a CUG subscriber.

In the following service activation and CUG selection for a CUG subscriber will be described with reference to FIG. 3. GPRS attach is performed when an MS indicates its presence to the GPRS network for the purpose of using GPRS services. This can be done immediately after the MS has been switched on or later as the subscriber decides to use the GPRS services. The MS identifies itself with its GSM identity IMSI (International Mobile Subscriber Identity) or TLLI (Temporary Logical Link Identity). The GPRS attach for a CUG subscriber may be carried out according to the prior art GPRS technology [GPRS attach].

The Packet Data Protocol (PDP) context functions are network level functions, which are used to bind the MS to various PDP addresses and after use to unbind the MS from these addresses. The PDP context defines different data transmission parameters, such as the PDP type (e.g. X.25 or IP), PDP address, quality of service QoS and NSAPI (Network Service Access Point Identifier). When the MS is attached to the network, it has to activate all the PDP addresses it wants to use for data traffic with the outside networks. After the PDP context is activated, MS, SGSN, GGSN or according to the invention the PTM-SC, have mapping and routing information for transferring packets for that particular PDP address. PDP addresses may be allocated dynamically to mobile stations, or static PDP addresses for each mobile station may be used. It is also possible to use an anonymous PDP context with a certain predefined anonymous access service provider.

According to a preferred embodiment of the invention, the PTM-SC comprises the same kind of functionality as the GGSN does, which enables the PTM-SC to communicate with external networks. However, it is also possible that data to/from external networks goes through the GGSN.

A request for PDP context activation is sent to the SGSN when a CUG subscriber wants to activate GPRS data transfer functions [activate_PDP_context_req]. The MS indicates whether dynamic or static PDP address will be used. The request also comprises information related to the requested PDP context, such as the requested quality of service. The request for PDP context activation advantageously comprises also the address of the PTM-SC. The address of the PTM-SC may be in the APN-field (Access Point Name), which typically refers to the external packet data network the subscriber wishes to connect to. The request may comprise CUG specific parameters requested by the MS, such as the identifier for the requested CUG. The CUG specific parameters may be in the PDP Configuration-field of the PDP context activation request message [activate_PDP_context_req].

After receiving the request for PDP context activation, the SGSN may initiate typical GPRS security functions [security functions]. The SGSN sends a PDP context activation request message comprising information about the requested PDP context to the PTM-SC [create_PDP_context_req]. The address of the PTM-SC may also be obtained from the subscriber data in the SGSN or HLR. The PTM-SC may be restricted to be the only possible GPRS access point for the CUG subscriber. CUG specific parameters are sent transparently through the SGSN to the PTM-SC in the message [create_PDP_context_req]. In GPRS there are also private extensions available, when CUG specific messages are not needed for the communication between the SGSN and the PTM-SC.

The PTM-SC comprises information for each CUG subscriber as described. The PTM-SC finds out the CUG which the subscriber wishes to select on the basis of the CUG identifier. If no CUG identifier is received, the PTM-SC may select a preferential CUG if one is determined for the subscriber. Thus the access conditions of the selected CUG will be used when packets are sent to or received for the subscriber. [CUG selection]

If the PDP context activation request is acceptable, the PDP context may be activated. The PTM-SC preferably comprises the same kind of information and functionality relating to PDP contexts as GGSN typically has. In case of incoming packets to the CUG subscriber having an active PDP context, the PTM-SC is thus aware of the correct SGSN that currently serves the CUG subscriber.

A response to the request for PDP context activation is sent from the PTM-SC to the SGSN [create_PDP_context_res]. The response comprises an PTM-SC address for signalling and an PTM-SC address for user traffic, which may differ from that provided by the underlying network service. The SGSN stores these PTM-SC addresses and uses them when sending signalling or user data packets to the PTM-SC for the MS. If the MS has requested dynamic PDP address and a dynamic PDP address has been allowed, the response also contains the dynamic PDP address for the MS allocated by the PTM-SC. The response from the PTM-SC may comprise some CUG parameters, which the SGSN advantageously relays transparently to the MS. For example, the CUG parameters may comprise information about CUG members or CUG restrictions.

If the SGSN receives the response with the cause value indicating 'Request Accepted', the SGSN returns a message of accepted PDP context request to the MS [activate_PDP_context_accept]. The message comprises information relating to the PDP context and possibly CUG parameters from the PTM-SC. If the MS accepts the PDP context, packets may be transferred to/from the MS from/to the PTM-SC.

The PDP context is then active and all data traffic to/from the MS goes through the PTM-SC according to subscriber conditions of the selected CUG. The PTM-SC thus relays of packets to/from other CUG subscribers or to/from other addresses possibly in external networks.

As described earlier, the CUG may be selected as part of the PDP context activation. It is also possible that the CUG is selected independently of the PDP context activation. The PDP context may be activated in the PTM-SC without selecting any CUG. The CUG may be selected transparently to the PDP context by sending a specific CUG activation message to the PTM-SC (after the PDP context is established). Thus the PDP context activation procedure may be carried out according to the prior art. This allows also the activation of several CUGs for one MS utilizing one PDP context. If the subscriber has selected more than one CUG utilizing a single PDP context, a CUG identifier is preferably associated with transferred data packets. The PTM-SC is then able to choose the access conditions of the identified CUG. If no CUG identifier is determined, the preferred CUG may be used. However, in the following description, it is assumed that it is possible to select one CUG per PDP context and thus no CUG identifier needs to be associated with transferred packets.

Figure 4:
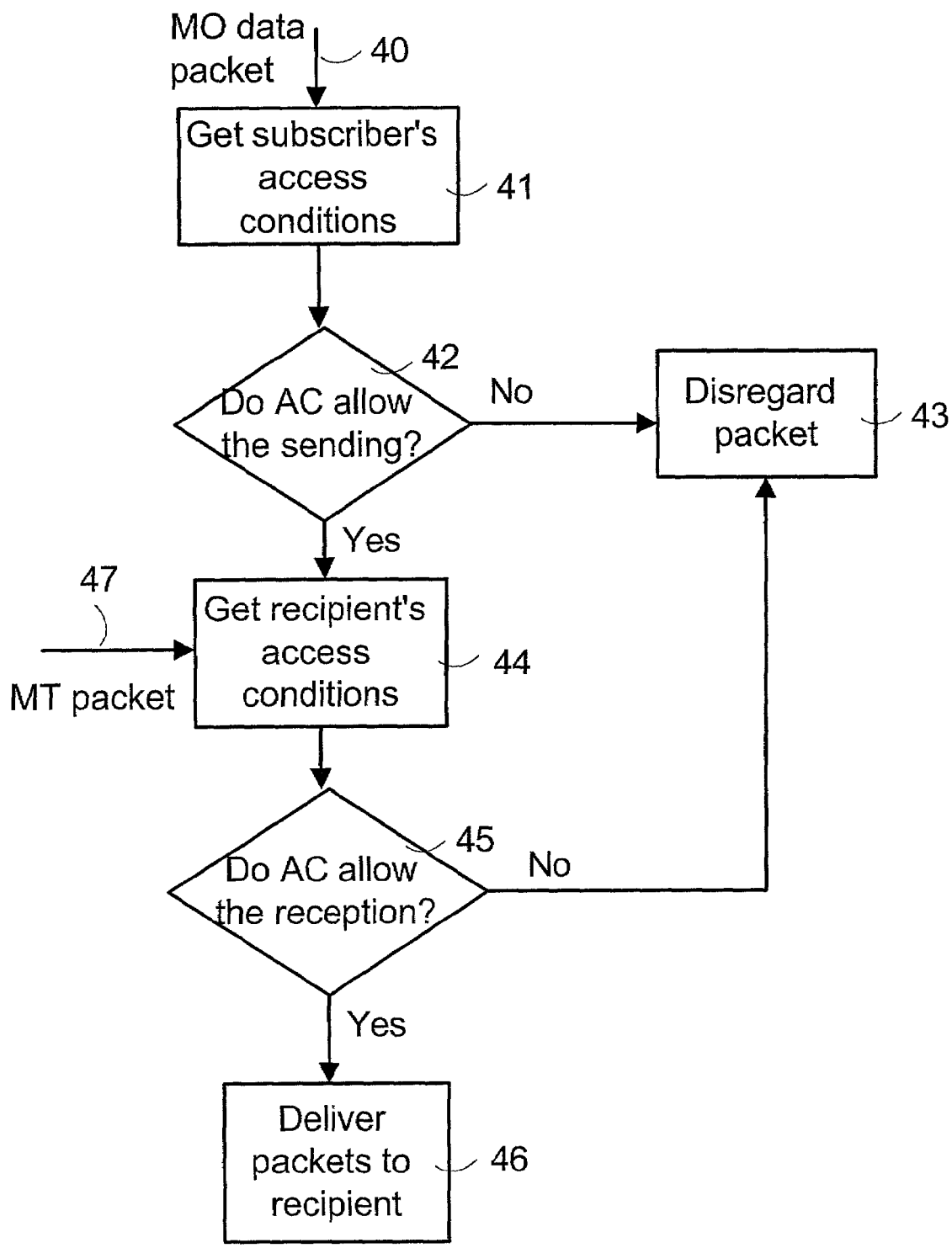
FIG. 4 is a flow diagram illustrating the functionality of PTM-SC for CUG subscribers.

According to the invention, a CUG subscriber may send packets to all active group subscribers, to at least one group subscriber or outside the group depending on the CUG access conditions. FIG. 4 shows a flow chart illustrating the basic functionality of the PTM-SC in the case of incoming and outgoing packets relating to CUG subscribers.

A CUG subscriber needs an active PDP context in order to send packets. Packets are transferred to the SGSN which forwards them to the PTM-SC 40. Preferably the CUG selected during the PDP context activation procedure will be automatically used. This means that the PTM-SC finds out the subscriber's access conditions according to the selected CUG 41 and evaluates whether the packets may be delivered on the basis of the access conditions 42. The checked access conditions may comprise outgoing access conditions and conditions relating to the requested address. If the access conditions do not allow packets to be sent to the recipient, the PTM-SC will disregard the packets and preferably send an error message to the sender subscriber 43.

If the access conditions of the MS permit the transfer of packets to the destination address, the PTM-SC will check if there are any further restrictions relating to the recipient 44. If the packets are addressed to another subscriber under conditions of the same or another CUG, the PTM-SC will check the recipient's CUG access conditions 45. The checked access conditions may comprise incoming access conditions and conditions relating to the sender address. If there are no CUG conditions concerning the recipient or the recipient's CUG conditions allow the reception of packets from the sender subscriber, the PTM-SC may initiate the delivery of packets to the recipient 46. If the access conditions do not allow the reception of packets, the packet will be disregarded 43. If packets received outside the CUG are addressed for a CUG subscriber 47, the recipient subscriber's access conditions will be checked correspondingly.

According to a preferred embodiment of the invention, as the access conditions are once checked for a certain packet, following packets to and from the same address will be transferred without any rechecking of CUG access conditions.

A CUG subscriber may be willing to send packets to all CUG subscribers. If packets are addressed to the CUG, the PTM-SC finds out the subscribers belonging to the CUG. The packets may comprise a CUG identifier, which can be used to identify the CUG as the recipient. Depending on the CUG subscription, the PTM-SC may also interpret the CUG as the recipient if the packets have no destination address. As CUG subscribers may have different access conditions, the PTM-SC may check the access conditions for each subscriber. However, as the packets are meant for all CUG subscribers, the check may not be needed. The PTM-SC then delivers the packets to allowed subscribers.

If packets are targeted outside the CUG, the PTM-SC preferably checks the subscriber's CUG outgoing access conditions (OA, Outgoing Access). As described earlier, there may be also Internet-address specific limitations. If the subscriber is allowed to send packets, the PTM-SC forwards the packets according to destination address. Thus the transmission of packets may be limited e.g. to certain company's Internet sites.

According to the invention a CUG subscriber (MS) may communicate point-to-point with another subscriber (MS2) belonging to the same CUG. Thus the MS sends data packets to the SGSN identifying the MS2 address as the recipient. The address of the MS2 depends on the context type, typically IP addresses are used. The SGSN relays the packets to the PTM-SC according to the active PDP context of the MS.

The PTM-SC preferably checks the CUG intra-group access conditions of the MS and the MS2. The PTM-SC may check the OAG-condition (Outgoing Access within the group) for the MS and IAG-condition (IAG, Incoming Access within the group) for the MS2. If the access conditions of the MS allow the transmission and the access conditions of the MS2 allow the reception, the PTM-SC may deliver the packets to the MS2.

According to the invention, a CUG subscriber may also send packets to or receive packets from more than one group member. For instance, the MS may send packets to three members of the group consisting of ten members. The delivery may be carried out as three separate deliveries or as a single delivery comprising three addresses of the recipients.

The PTM-SC may also comprise a DNS (Dynamic Name Service), which enables logical names to be associated with CUG subscribers. For example, packets sent by a CUG subscriber may identify "Mike" as the recipient instead of an ordinary IP address. The PTM-SC is then able to associate the logical name "Mike" as the subscriber of the CUG and deliver the packet to the right IP-address of "Mike". Furthermore, some group members may be logically grouped e.g. by single "colleagues" identity. The PTM-SC then delivers the packets to members on the basis of the identity.

A GPRS attached CUG subscriber may receive packets from CUG subscribers and also from other allowed addresses. In the following, the PTP delivery of packets to a CUG subscriber will be described, the assumption is that the subscriber's access conditions allow the reception of packets.

Packets from external networks for a CUG subscriber may be routed through the PTM-SC in the same way as packets are routed through the GGSN. From the external networks' point of view the PTM-SC may be seen as a router to a subnetwork comprising CUG subscribers. The sender needs to know the IP address of the CUG subscriber that belongs to the address space controlled by the PTM-SC. If packets are addressed to a single CUG subscriber, the CUG identifier is not necessary. In order to send packets to all members of the CUG, a group specific address has to be reserved.

If the PDP context is active for the CUG subscriber, the PTM-SC may easily forward the packets to the correct SGSN. The SGSN transfers the packets to the correct BSC. The BSC then sends the packets to the correct BTS which further delivers the packets to the CUG subscriber.

The request for PDP context activation can also be made by the network if packets are addressed a CUG subscriber without an active context and the MS is attached to the GPRS network. In this case the PTM-SC may initiate the PDP context activation procedure. The PTM-SC may send a routing information request to the subscriber's HLR. If the request can be served, the HLR returns routing information comprising the address of the correct SGSN address to the PTM-SC. The PTM-SC may then initiate PDP context activation by notifying the SGSN of incoming data for the subscriber. The SGSN then sends a request for PDP context activation for the MS. The PDP context may be then activated according to the above description. As the PDP context is activated, the packets may be sent to the subscriber.

In case of multiple recipients (CUG subscribers), packets may be sent also according to the packet delivery of the PTM-G service. Thus the CUG packets may be delivered by broadcasting to the relevant SGSNs or by initiating point-to-point transmissions for each subscriber by the PTM-SC. The PTP transmission of packets of the CUG service is easy to implement, because it can reuse the existing reliable PTP bearer services. The usage of the PTP makes the service transparent to other network elements like the SGSN, but if there are many CUG subscribers in one cell or routing area, the load on the network may increase dramatically. The invention can be applied irrespective of the packet delivery method.

If the subscriber receives packets correctly, a positive acknowledgement may be sent from the MS to the PTM-SC. The PTM-SC may then send an acknowledgement to the sender. If there are multiple recipients, the PTM-SC preferably sends a single message to the sender informing the success of deliveries to recipients.

Routing area updates may be carried out according to the prior art GPRS technology. If the serving SGSN changes, then the PTM-SC will be notified advantageously in the same way as the GGSN is notified during routing area updates. The PTM-SC does not have to be aware of the current location of a CUG subscriber.

The PDP context may be deactivated by the MS, SGSN or PTM-SC. The deactivation of the PDP context or GPRS detach removes the PDP context information in the PTM-SC. It is also possible that timers are used to limit the usage of PDP context. Preferably the CUG chosen at PDP context activation will be used until the PDP context information is removed.

The PTM-SC functions relating to the CUG service described above may be implemented also in other network elements. The PTM-SC according to the above description also comprises the GGSN functionality, especially relating to PDP activation. Thus CUG functions may be implemented in the GGSN instead of the PTM-SC. It is also possible that the PTM-SC does not comprise any GGSN functionality, when GGSN is needed for providing access from the PTM-SC to other networks.

There may also be a separate CUG network element controlling specially closed user group services, or CUG functions may be implemented in a subscriber database such as the HLR.

It is obvious to one skilled in the art that as the technology develops, the inventive concept can be implemented in many different ways. Hence the invention and its embodiments are not limited to the above examples, but may vary within the scope of the appended claims.

The invention claimed is:

1. A method of providing closed user group service in a mobile communication system enabling packet-switched data services and comprising at least one network element controlling point to multipoint packet services and at least one group comprising a plurality of group subscribers, the method comprising:

determining, for said network element, closed user group access conditions for at least one subscriber belonging to the group, said access conditions comprising at least one of the following conditions:

a right to receive packets from parties outside the group, a right to receive packets from a part of the group substantially simultaneously without communicating with all members of the group, and checking said access conditions in said network element when there is a need to transfer packets to at least one subscriber of the group.

2. The method of claim 1, wherein the addresses that are allowed are determined in said access conditions.

3. The method of claim 1, wherein outgoing and incoming access conditions separately are determined in said access conditions.

4. The method of claim 1, wherein adjacent packets are transferred without rechecking said access conditions after first packet, in response to the checking of said access conditions of the first packet and the source and the destination addresses in the adjacent packets being the same as in the first packet.

5. The method of claim 1, wherein a group is selected for the subscriber during the activation of data transfer arrangement for a mobile station of the subscriber, and
the access conditions of the selected group are used when packets to/from the subscriber are being sent until the data transfer arrangement is deactivated or reconfigured.

6. The method of claim 5, wherein the data transfer arrangement is packet data protocol PDP context.

7. The method of claim 1, wherein the used group is identified when data packets are being sent, and
the access conditions of the identified group are used for the data packets.

8. The method of claim 1, further comprising transferring packets from said network element to desired addresses if said access conditions allow the transmission.

9. A mobile telecommunications system providing packet-switched data services and comprising at least one network element controlling point to multipoint packet services and at least one group comprising a plurality of group subscribers, wherein the network comprises means for determining closed user group access conditions for at least one subscriber belonging to the group, said access conditions comprising at least one of the following conditions:
a right to receive packets from parties outside the group,
a right to receive packets from a part of the group substantially simultaneous without communicating with all members of the group, and
said network element is configured to check said access conditions when there is a need to transfer at least one subscriber of the group.

10. The mobile telecommunication system of claim 9, wherein said access conditions comprise allowed addresses and/or separate conditions for outgoing and incoming packets.

11. The mobile telecommunication system of claim 9, wherein said network element is configured to transfer adjacent packets without rechecking said access conditions after first packet, in response to the checking of said access conditions of the first packet and the source and the destination addresses in the adjacent packets being the same as in the first packet.

12. The mobile telecommunication system of claim 9, wherein said network element is configured to select a group for the subscriber during the activation of data transfer arrangement for a mobile station of the subscriber, and
said network element is configured to use the access conditions of the selected group when packets to/from the subscriber are being sent until the data transfer arrangement is deactivated or reconfigured.

13. The mobile telecommunication system of claim 12, wherein the data transfer arrangement is packet data protocol PDP context.

14. The mobile telecommunication system of claim 9, wherein said network element is configured to identify the used group when data packets are being sent, and
said network element is configured to use the access conditions of the identified group for the data packets.

15. The telecommunications system of claim 9, wherein said network element is configured to transfer packets to desired addresses if said access conditions allow the transmission.

16. A network element controlling point to multipoint packet services in a packet radio system, wherein said network element comprises means for determining access conditions for at least one subscriber belonging to at least one closed user group, said access conditions comprising at least one of the following conditions:
a right to receive packets from parties outside the group, and
a right to receive packets from a part of the group substantially simultaneously without communicating with all members of the group,
wherein said network element comprises means for checking said access conditions when there is a need to transfer packets to at least one subscriber of the group.

17. The network element of claim 16, wherein said access conditions comprise allowed addresses and/or separate conditions for outgoing and incoming packets.

18. The network element of claim 16, wherein said network element is configured to transfer adjacent packets without rechecking said access conditions after first packet, in response to the checking of said access conditions of the first packet and the source and the destination addresses in the adjacent packets being the same as in the first packet.

19. The network element of claim 16, wherein
said network element is configured to select a group for the subscriber during the activation of data transfer arrangement for a mobile station of the subscriber, and
said network element is configured to use the access conditions of the selected group when packets to/from the subscriber are being sent until the data transfer arrangement is deactivated or reconfigured.

20. The network element of claim 17, wherein the data transfer arrangement is packet data protocol PDP context.

21. The network element of claim 16, wherein
said network element is configured to identify the used group when data packets are being sent, and
said network element is configured to use the access conditions of the identified group for the data packets.

22. The network element of claim 16, wherein said network element is configured to receive group identification information,
said network element is configured to select a group on the basis of the received group identification information, and
said network element is configured to apply access conditions of the selected group.

23. The network element of claim 16, wherein said network element is configured to send packets if said access conditions allow the transmission.

24. A network element for controlling point to multipoint packet services in a packet radio system, wherein said network element is configured to determine access conditions for at least one subscriber belonging to at least one closed user group, said access conditions indicating at least one of the following conditions:
right to receive packets from a given party outside the group,
right to receive packets from a given group member,
said network element is configured to check said access conditions, and
said network elements is configured to prevent transmission of packets from said party or group member to the subscriber if said access conditions do not allow the transmission.

25. A network element as claimed in claim 24, wherein an address of the party is specified in said access conditions, and
said network element sis configured to check on the basis of said access conditions if reception is allowed for the subscriber from the address.

* * * * *